United States Patent
Meyn et al.

(10) Patent No.: US 7,384,594 B2
(45) Date of Patent: Jun. 10, 2008

(54) METHOD FOR THE PYROMETALLURGICAL TREATMENT OF METALS, METAL MELTS AND/OR SLAGS AND INJECTION DEVICE

(75) Inventors: Matthias Meyn, Hilden (DE); Peter Monheim, Dorsten (DE); Reinhard Scholz, Clausthal-Zellerfeld (DE)

(73) Assignee: SMS Demag AG, Dusseldorf (DE)

( * ) Notice: Subject to any disclaimer, the term of this patent is extended or adjusted under 35 U.S.C. 154(b) by 617 days.

(21) Appl. No.: 10/501,529

(22) PCT Filed: Jan. 13, 2003

(86) PCT No.: PCT/EP03/00237

§ 371 (c)(1),
(2), (4) Date: Jul. 14, 2004

(87) PCT Pub. No.: WO03/060169

PCT Pub. Date: Jul. 24, 2003

(65) Prior Publication Data

US 2005/0040571 A1    Feb. 24, 2005

(30) Foreign Application Priority Data

Jan. 15, 2002    (DE)    ................................ 102 01 108

(51) Int. Cl.
*C21B 11/10*    (2006.01)
*C21C 7/072*    (2006.01)

(52) U.S. Cl. ........................ 266/222; 266/217; 266/268

(58) Field of Classification Search ................ 266/217, 266/222, 266, 267, 268
See application file for complete search history.

(56) References Cited

U.S. PATENT DOCUMENTS

| 6,030,431 | A | 2/2000 | Deloshe et al. | |
| 6,342,086 | B1 * | 1/2002 | Shver | 75/10.4 |
| 6,368,550 | B1 * | 4/2002 | Wagener et al. | 266/268 |
| 6,372,010 | B1 * | 4/2002 | Shver et al. | 75/10.4 |
| 6,383,445 | B1 * | 5/2002 | Anderson et al. | 266/268 |
| 6,450,799 | B1 | 9/2002 | Mahoney et al. | |

FOREIGN PATENT DOCUMENTS

| EP | 0866138 | 9/1998 |
| FR | 2644558 | 9/1990 |
| FR | 2681417 | 3/1993 |

* cited by examiner

*Primary Examiner*—Scott Kastler
(74) *Attorney, Agent, or Firm*—Abelman, Frayne & Schwab

(57) ABSTRACT

In the metallurgical treatment of metals, metal melts and/or slags in a metallurgical unit or melting vessel, especially in electric arc furnaces, injection devices (1) are used for blowing in or up oxygen-rich gases (6) and/or carbonaceous substances, which cause as long as possible gas jet (6') with a high pulse energy to strike to strike the surface of the slag or metal. It is known to envelope produced gas jet (6'), thereby focusing it. According to the invention, such an envelope is obtained by using a hot gas (5, 5') that is preaccelerated to such a degree that the central gas jet (6') is preferably without pulse losses.

8 Claims, 4 Drawing Sheets

Figure 1:
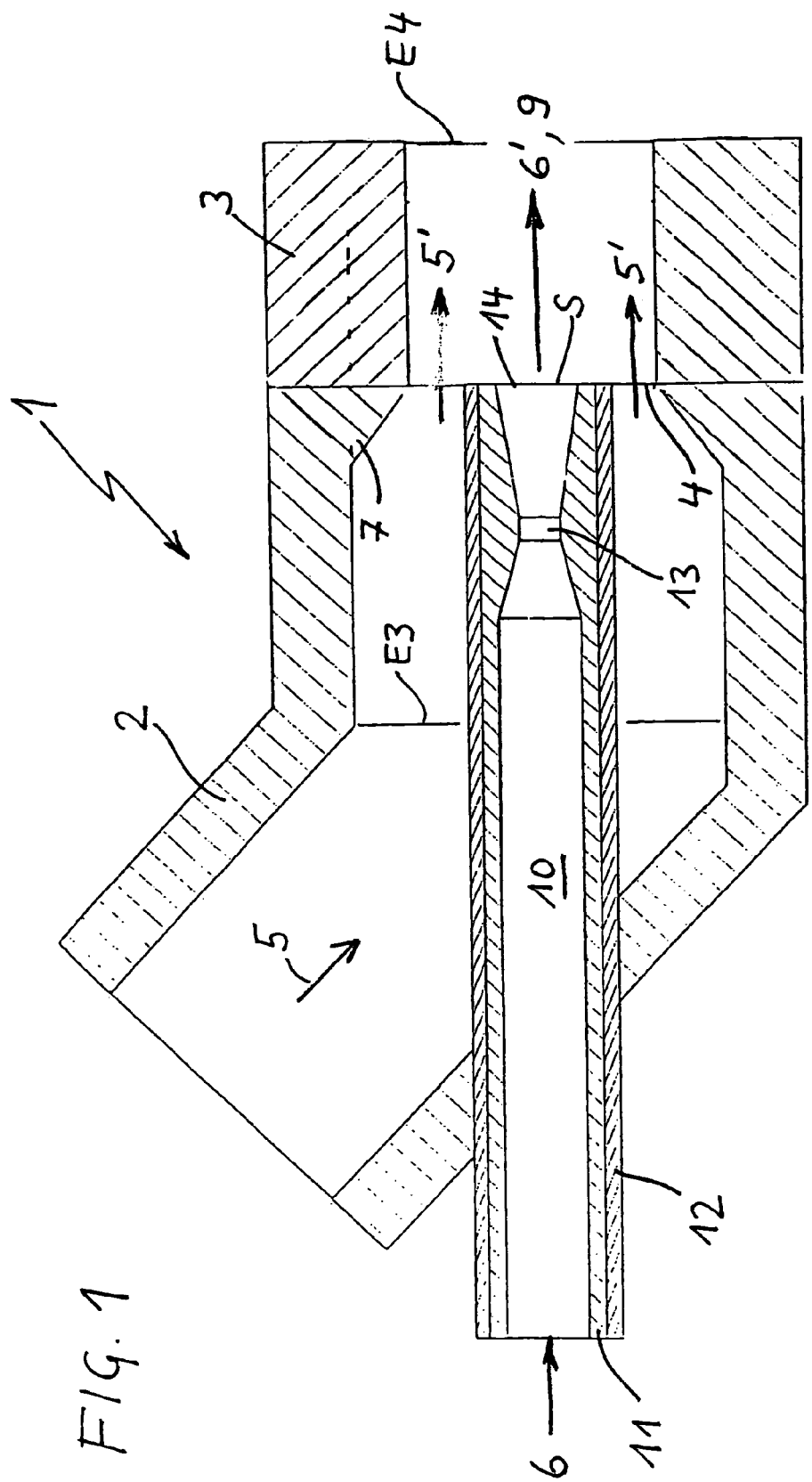

METHOD FOR THE PYROMETALLURGICAL TREATMENT OF METALS, METAL MELTS AND/OR SLAGS AND INJECTION DEVICE

The present invention relates to a method of pyrometallurgical treatment of metals, metal melts and/or slags in a metallurgical installation or a melting vessel, in particular for blowing up or in oxygen-rich gases in an electric arc furnace (EAF) with an injection device which accelerates oxygen-containing gases to a supersonic speed, with admixing to the oxygen-rich gases, if needed, carbon-containing materials, preferably particles, and with an ejected, therefrom, high-velocity jet being protected by a gaseous envelope completely enveloping same for using the same for pyrometallurgical treatment.

Known are injection devices for liquid and particle-shaped material for use in industrial installations, advantageously, for a pyrometallurgical treatment of metal and metal melts, in particular in electrical arc furnaces for blowing oxygen-rich gases and/or carbon-containing particles in or up foamed slag layer/slag of an electric arc furnace for foaming the slag, and/or for blowing up or in of oxygen-rich gases in or up a metal melt, which is located beneath the slag/foamed slag layer for its decarburization. With these injection devices, the oxygen-rich gas is accelerated to a supersonic speed by using a nozzle and, if necessary, the carbon-containing particles are admixed to the oxygen-rich gas.

Melting of solid charge materials such as e.g., scrap or spongy iron in electrical are furnaces requires a large amount of energy (about from 550 to 750 kWh/t for ingor steel). In order to reduce the energy consumption and to shorten the melting time, a chemical energy is added (e.g., natural gas or coal). In order to insure high reaction temperatures, the combustion is effected primarily with the use of a technically pure oxygen. Thereby, simultaneously, the amount of the to-be-treated waste gases is noticeably reduced, in comparison with the use of air. During certain phases of a melting process, for backing up or accelerating scrap heating-up or melting-down, blowing-in of oxygen and/or of the primary energy carrier (e.g., natural gas) takes place. The reaction takes place above the melt, advantageously, in direct contact with the solid material. The addition of the natural gas or of oxygen is effected with a special burner in the furnace wall or with water-cooled lances.

A further phase of the pyrometallurgical treatment is the foamed slag phase. The foamed slag should protect or screen the furnace wall from the electrical arc radiation during the flat bath phase in order to prevent overheating of the wall regions, to even effectiveness of the electrical arc, and to provide for a high energy efficiency by reducing the radiation losses. In order to form the foamed slag, simultaneously, fine-grained carbonaceous materials and oxygen are blown in, preferably, into the boundary layer between the slag and metal.

The addition of the carbon carrier takes place preferably in the region of the boundary layer between the metal melt and the slag (partially beneath the surface of the metal melt). As carriers, advantageously, compressed air, nitrogen, and gaseous hydrocarbons are used.

The injection of the oxygen takes place preferably in the region of the boundary layer between the metal melt and the slag for partial oxidation of powdered carbon and for decarburizaion of the metal melt. During the partial oxidation of the carbon, which is contained in the carbon carrier, carbon monoxide (CO) is formed. CO is released from slag in form of gas bubbles. They cause foaming of the slag. The foamed slag improves the energy utilization and reduces the load applied to the refractory brick wall of an electric arc furnace. CO can be burned thereafter inwardly or outwardly by a separate addition of a further oxidant.

The addition of carbon carriers, oxygen, and other oxidant is effected together or separately with
   a) special injection-/nozzle devices in the furnace wall
   b) cooled lances through the door/the furnace wall/the ceiling
   c) non-cooled lances through the door/the furnace wall/the ceiling
   d) nozzle system locatable under the bath.

The devices and methods for the above-described tasks have, in particular, the following drawbacks.

During the injection of gas/solid material with common injection devices, the above-described functions are integrated in a single unit. However, the injected components present, during separate process steps, different and partially contradictory requirements to the associated injection system (with regard to flow velocity, the injection site, mixing/burning-out behavior, input into the melt, etc.). Therefore, the units are very large or compromised solutions should be used.

EPO 0 964 065 A1 discloses an injection device consisting of two components one of which is formed as a supersonic oxygen injector and the other is formed as a coal injector. The axes of both components are so aligned that the two produced jets intersect each other above the bath surface. In order to insure focusing of the central oxygen or the coal jet to a most possible extent, they are enveloped with a natural gas jet that is ejected through a nozzle ring surrounding the central nozzle opening.

U.S. Pat. No. 5,904,895 discloses a water-cooled injection device with a combustion chamber for producing a high-speed flame for melting down solid materials located in front of the combustion chamber. As melting progresses, fine-dispersed solid materials, e.g., coal, and an additional oxygen can be brought into the electric arc furnace, with the solid material being admixed sidewise to the already accelerated oxygen jet. Both, the jet of the solid material and the high-speed oxygen jet are protected by a surrounding them, flame envelope.

EPO 0 866 138 discloses a method of injecting gases (e.g., oxygen and a natural gas) into the melt. Here, oxygen which is ejected centrally from an injector, is accelerated to a supersonic speed with a Laval nozzle. In order for the jet to retain its outer pulse straight as long as possible, it is protected by a flame envelope that surrounds it (completely). The flame envelope is produced by combustion of a natural gas which is ejected through an annular slot or a nozzle ring, which concentrically surrounds the Laval nozzle, and oxygen. The oxygen is fed through a second annular slot or nozzle ring which is concentrically arranged outwardly of the natural gas ring.

EP1 092 788 A1 discloses an injection device which is based on the principle of EP 0866 138 A1 and additionally includes injection of a particle-shaped solid material. The injection of the solid material is effected in the same way as injection of oxygen, inside of a flame envelope.

EP 0 848 795 discloses a method of coombustion of fuel and an associated burner. As fuel, both natural gas and a particle-shaped solid material are used. Here, several natural gas jets, which are inclined toward the central axis, are blown in a cylindrical or slightly cone-shaped main oxygen jet that widens in the jet direction. A Laval nozzle accelerate the jet to a supersonic speed. The fuel jets surround the main jet and penetrate thereinto downstream. Within the main stream, a second fuel jet is formed by using a central tube, with the natural gas or the solid material being sprayed into the main jet after its acceleration.

In order to delay widening of the jets over their paths as long as possible, when injection devices are used, the produced jets are surrounded several times with a flame envelope that is usually produced by combusting a natural gas. The drawback of a flame envelope consists in an undesirable pulse loss of the central jet because the flow velocity of the envelope jet is substantially lower than that of the central jet. In addition, this measure requires use of additional materials and, therefore, is associated with high energy costs. This is wasteful from the technological point of view and is also at times ineffective.

Proceeding from the known state of the art, the object of the invention is to provide an injection device and a method with which it would be possible to maximize the length of a jet of an oxygen-rich gas that flows free in the inner space of a metallurgical installation, and its penetration depth into the slag layer. Here, in particular, the drawbacks of the known devices for common injection of oxygen and solid material at different operational conditions namely high energy consumption necessary manipulations or provision of several openings in the metallurgical installation complicated construction should be eliminated to a most possible extent.

The object of the invention is achieved with a method according to which a hot gas forms a gaseous envelope and is so fed to the central high-speed jet that the relative speed and the pulse exchange between the high-speed central jet and the hot gas envelope jet is minimized (quasi isokinetic feeding).

An injection device for effecting the inventive method is characterized by a modular construction of separate subassemblies consisting of an oxygen injector with an inner wall and a Laval nozzle for accelerating an oxygen-rich gas, which is surrounded by a hot gas union in an outlet region of which is arranged an annular slot nozzle or similar constructed means with a comparable action for passing and acceleration of a hot gas.

With the inventive method, enveloping of the central oxygen-rich gas jet with hot gas with as small as possible pulse loss, permits, advantageously, to maximize the length and the penetration depth of the gas jet into the slag layer located above the metal melt for obtaining of an intensive intermixing and movement, and to improve injection of a particle-shaped solid material, e.g., carbon carrier, dust, or additives.

At that, the central gas jet is. injected with an oxygen injector (a long tube with a Laval nozzle) and is accelerated to a speed between 300 and 850 m/sec and, contrary to the known solutions, is enveloped with a hot gas envelope. The hot gas is produced by an external combustion in a hot gas generator, e.g., by combustion of a natural gas-air mixture in a conventional high-speed burner, by recirculation of hotter furnace gases using a separate high-temperature compressor, or by combination of both methods.

When the hot gas is produced by an external reaction of fuel with an oxidant, an oxidant with an oxygen content from 10 to 100% by volume and, preferably, 21% by volume is used. The oxidation process in each case is effected leaner than stoichiometrically. The air ratio in the hot gas generator is set between 1.05 and 2.0 (preferably 1.3-1.5). The oxidant can be preheated to a temperature between 50° C. and 600° C. (preferably between 200° C. and 400° C.). The preheating can take place externally or in the injection device. Preferably. The preheating of the oxidant is integrated into the cooling system of the injection device or forms its essential component.

The temperature of the hot gas upon entry in the torch amounts from 300° C. to 1,800° C. In this temperature region, the sonic speed of the hot gas, as a result of thermodynamic relationships on which the process is based, is substantially higher than that of a cold central jet. Therefore, the exit speed of the hot gas is lifted up to the region of speeds of the central jet with a simple nozzle.

According to the invention, for a temperature control, it is possible to inject water into the hot gas before its acceleration. Thereby, a rapid and precise temperature control is insured. In addition, an increased content of water vapors positively influences the reaction atmosphere in the furnace well.

The injection device of the invention consists, in modular implementation, of a long tube with a Laval nozzle, an oxygen injector for acceleration of the oxygen-rich gases the outlet region of which is surrounded by an annular slot nozzle or a similar construction with a comparable action for passing of the hot gas therethrough. For focusing and for improving flow ratios in the outlet plane, the outlet regions of both gases are extended by a hot gas sleeve.

For injection of particle-shaped materials, there is arranged centrally in the oxygen injector an additive injector in form of an additional coaxial tube with an outlet opening. The additive injector is axially displaceable. The outlet plane of the additive injector can be positioned (viewed in the flow direction) both in front of and behind the inlet cross-section of the confusor of the Laval-nozzle of the oxygen injector. The positioning of the outlet opening of the additive injector within the oxygen injector can be effected by an axial displacement of the additive injector, of the oxygen injector or by the combination of both. The outlet opening of the additive injector can be formed as a simple mouth or as a nozzle. Preferably, the outlet opening of the additive injector is position in front of the Laval nozzle of the oxygen injector, so that the particle-shaped material is accelerated, together with the oxygen-rich gas, by the Laval nozzle.

Because of a high wear which is caused by load applied by the particle-shaped material, the outlet opening of the additive injector is formed of a wear-resistant material. For protection of the outer shell of the oxygen injector, it can be provided with a ceramic protection layer or be surrounded with a ceramic protection tube.

It is also possible to inject, through the additive injector into the oxygen-rich gas jet, other material than a particle-shaped material, e.g., a gaseous fuel, such as natural gas, or a liquid fuel such as oil. In order to adapt to different special demands of respective fuels, different embodiments of additive injectors are necessary. Those are rapidly adaptable, and with only low costs, by provision of suitable constructions, to respective process requirements and are provided, e.g., with a replaceable outer nozzle and suitable additional elements, and are made axially displaceable, manually or automatically.

The injection device for injecting gas or solid materials is formed as a modular construction. Separate components are mounted on a common support fixedly secured in a wall of a metallurgical installation. Thereby, an undesired entry of the surrounding air into the furnace well and a dangerous exit of the reaction gases in the environment is reliably prevented.

The injection device can be universally used for adding during separate phases of a metallurgical process, necessary materials (oxygen, oxygen carriers, additives, etc.) in the necessary quantity and with the necessary quality as a result of formation of robust and constructively simple components. This guarantees small maintenance and installation costs and provides, if needed, for rapid replacement of separate components even during operation of a furnace.

To insure a high efficiency of the injection system, more than one injection device can be provided for a meting installation (preferably from two to four). The operation of the injection device is coordinated and monitored by an overriding system.

Further advantages, particularities, and features of the invention will be explained in detail below with reference to schematic drawings which show in embodiments of the invention.

Figure 2:
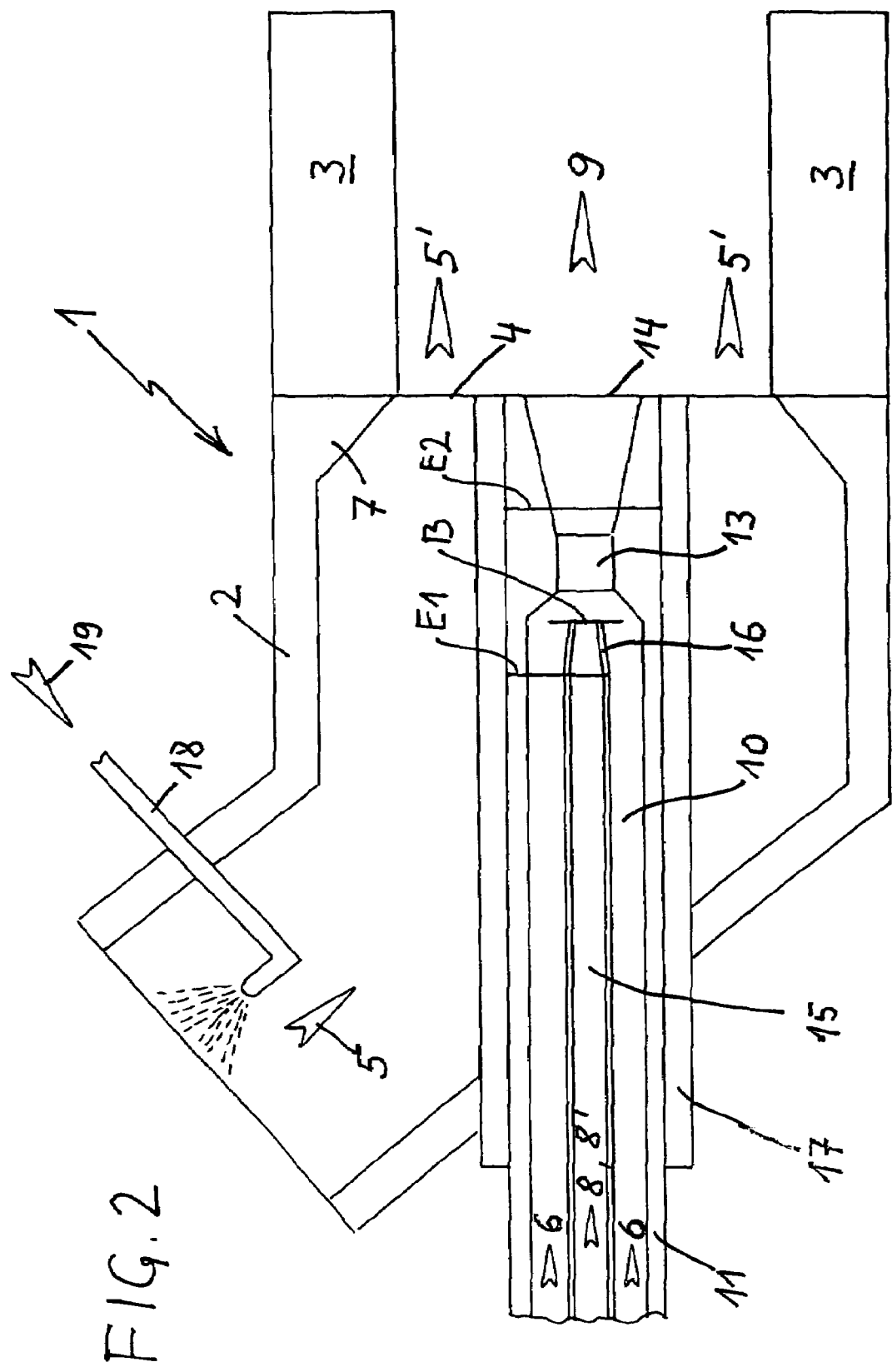
Figure 3:
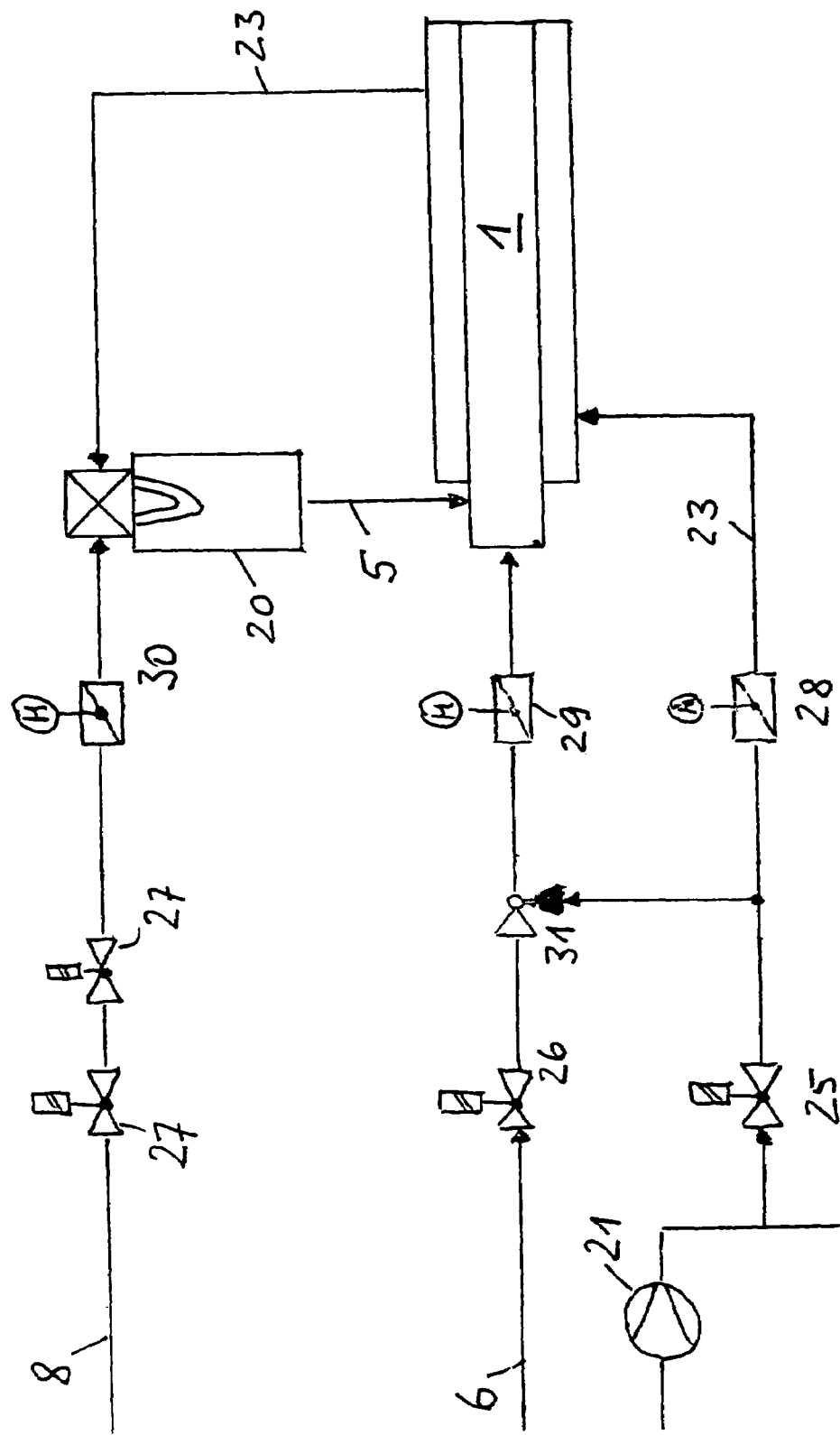

The drawings show:

FIG. 1 a cross-sectional view of an injection device according to the invention (basic version);

FIG. 2 a cross-sectional view of the injection device shown in FIG. 1 with an injector of additives;

FIG. 3 a flow diagram of the injection device; and

Figure 4:
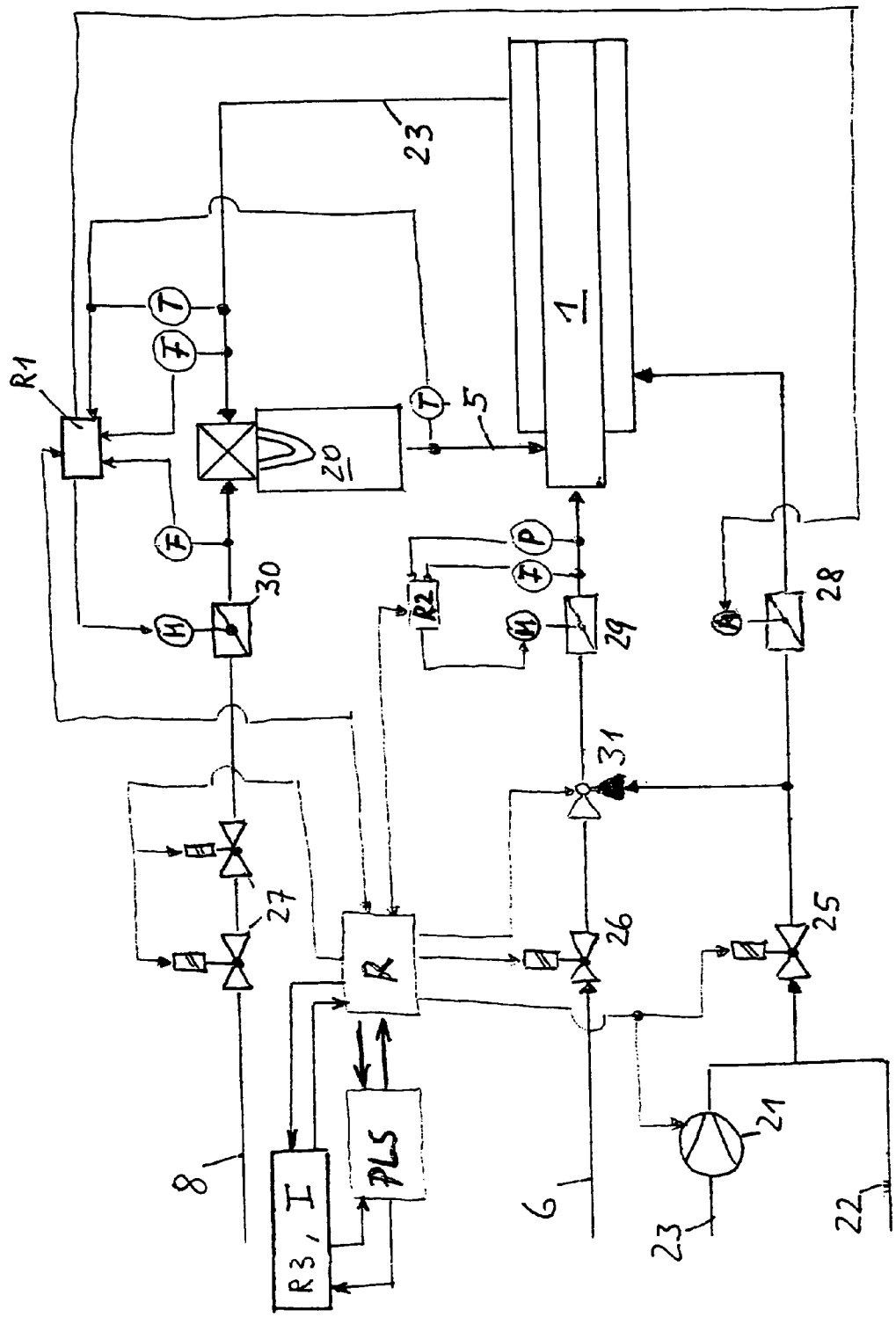

FIG. 4 measurement and control diagram (flow chart) of the injection device.

FIG. 1 shows a schematic cross-sectional view of an injection device 1 according to the invention which in the shown embodiment essentially consists of an angled hot gas union 2 into which an oxygen injector 10 is inserted sidewise. The insertion of the oxygen injector 10 is effected, preferably, in such a way that the longitudinal axis of the oxygen injector 10 coincides with the longitudinal axis of the horizontal portion of the injection device 1. At its front, at the right of the drawing, the inner diameter of the hot gas union 2 is reduced by an inclined inward thickening 7 (confusor) to such an extent that the hot gas union 2 forms with the oxygen injector 10 in this region a concentric annular slot nozzle 4 or constructively similar means with a comparable action (referred to below as annular slot nozzle for simplicity sake).

The oxygen injector 10, which is inserted in the hot gas union 2, consists of an elongate tube or an injector inner wall 11 surrounded by a ceramic protection layer 12 and having a Laval nozzle 13 in its front region. The oxygen-rich gas 6 flows through the Laval nozzle 13 in the direction shown with arrow, is accelerated, and is ejected from outlet opening 14 in the direction shown with arrow as a central gas jet 6'. In the outer region the oxygen-rich gas jet 6' is enveloped by the flowing in the same direction, hot gas 5' which is accelerated in the annular slot nozzle 4. For focussing the gas jets 5', 6', the outer region is elongated by a hot gas sleeve 3 the inner diameter of which corresponds to the smallest outer diameter of the annular slot nozzle 4.

The oxygen injector 10 is axially displaceable, with its outlet plane 5 being positioned between planes 3 and 4 of the hot gas union 2 in any arbitrary position of the oxygen injector.

FIG. 2 shows an injection device 1 that in comparison with the injection device 1 of FIG. 1, further includes an additional additive injector 15 and water spray means 18. The same components are shown with the same reference numeral for a better understanding. The water spray means18 is located in the entry region of the injection device 1 in the hot gas union 2 and is so arranged that the water 19 is injected in this region in a direction opposite the flow direction of the hot gas 5 in this region. The oxygen injector 10 is not any more surrounded by a ceramic protection layer, as in the embodiment of FIG. 1, but is held with a ceramic protection tube 17. The additive injector 15 consists essentially of an elongate tube with a front fuel nozzle 16 and is inserted in the oxygen injector 10 so far that the opening of the nozzle 16 is located in front of the Laval nozzle 13 of the oxygen injector 10. In this way, carbon-containing materials 8, 8' and the oxygen-reach gas 6' are ejected together from the outlet opening 14 as a central jet 9.

FIG. 3 shows a principle scheme of feeding of media necessary for the operation of the injection device 10 and a typical circuitry of the injection device 1. The hot gas 5 is produced in an external separate generator 20 from a fuel stream 8 and a stream of the oxygen-rich gas 6. Advantageously, the hot gas generator 20 is directly connected with the injection device 1 or forms an essential component thereof. In the shown embodiment, an oxidation air 23 is used. The air 23 can be fed by a separate blower 21 or from a compressed air network 22. The air 23 is used, before it is fed to the hot gas generator 23, for cooling the outer wall of the injection device 1. It is preheated to temperatures from 50° to 600°. The preheating positively influences the treatment of fuel in the hot gas generator 20. The operation of the hot gas generator 20 is not interrupted. The same is true for the cooling system. By actuation of stop valves 25, 26, 27, the feeding of a respective medium stream is started or interrupted. The regulation of the flow volume is effected with control valves 28, 29, 30. During injection of oxygen, the multi-way valve 31 is closed in such a way that air flow to the oxygen injector is interrupted. When for technological reasons, no oxygen injection is necessary, the multi-way valve 31 is closed in such a way that the oxygen flow to the oxygen injector is interrupted. In this case, air 23 is fed to the oxygen injector 10.

FIG. 4 shows a measurement and control diagram (flow chart) for the injection device 1. For a reliable operation of the injection device 1 accordance with regulations, the positions of the stop valves 25, 26, 27 should be monitored and changed in a controlled manner. The occurrences of non-permitted and/or dangerous operational conditions is prevented by corresponding locking/blocking. A central automation unit R communicates with an overriding PCS (process control system) of a metallurgical installation and communicates, in accordance with the operating mode, necessary commands to subordinate units as well as R1 and R2. The automation unit R1 is responsible for controlling the hot gas temperature, output of the hot gas generator, and the air ratio. The necessary process parameters are continuously acquired with corresponding sensors and are transmitted to a computer. The automation unit R2 serves for controlling of the oxygen volume.

The control of the operation of the additive injector 15 is effected by a further automation unit (e.g., for mass flow, admission pressure). This control is represented in FIG. 4 by automation unit R3.

According to the invention, several preferably, from two to four injection devices can be associated with a metallurgical installation. For common control of these injection devices 1, a data exchange takes place between the automation unit R and the PCS.

LIST OF REFERENCE NUMERALS

| | |
|---|---|
| 1 | Injection device |
| 2 | Hot gas union |
| 3 | Hot gas sleeve |
| 4 | Annular slot nozzle |
| 5, 5' | Hot gas |
| 6, 6' | Oxygen-rich gas |
| 7 | Thickening |
| 8 | Fuel |

-continued

| | |
|---|---|
| 9 | Central jet |
| 10 | Oxygen injector |
| 11 | Injector inner wall |
| 12 | Ceramic protection layer |
| 13 | Laval nozzle |
| 14 | Outer opening |
| 15 | Additive injector |
| 16 | Outer opening |
| 17 | Ceramic protection tube |
| 18 | Water spray means |
| 19 | Water |
| 20 | Hot gas generator |
| 21 | Blower |
| 22 | Compressed air network |
| 23 | Air |
| 25, 26, 27 | Stop valves |
| 28, 29, 30 | Control valves |
| 31 | Multi-way valve |
| 1 | Further injection devices |
| PCS | Process control system |
| R | Central automation unit |
| R1 | Automation unit |
| R2 | Automation Unit |
| R3 | Automation Unit |

The invention claimed is:

1. An injection device (1) for pyrometallurgical treatment of metals, metal melts, and or slags in a metallurgical installation or a melting vessel, in particular for blowing up or in oxygen-rich gases and/or carbon-containing material in an electric arc furnace, wherein the injection device accelerates oxygen-containing gases, (6) to a supersonic speed, with an ejected therefrom, high-velocity jet (6') being protected by a gaseous envelope completely enveloping same for using the same for pyrometallurgical treatment, characterized by a modular construction of separate subassemblies consisting of an oxygen injector (10) with an inner wall (11) and a Laval nozzle (13) for accelerating an oxygen-rich gas (6), and a hot gas union (2) surrounding the oxygen injector (10) and an outlet region of which has an inwardly directed thickening (7) that forms, together with the oxygen injector (10), an annular nozzle slot (4) for passing and acceleration of a hot gas (5).

2. An injection device (1) according to claim 1, characterized in that
the oxygen injector (10) is axially displaceable and wherein an outlet plane (5) of the oxygen injector (10) in each position thereof is located between planes (E3) and (E4) of the hot gas union (2).

3. An injection device (1) according to claim 1, characterized in that
outlet regions of the gases are extended by a common hot gas sleeve (3).

4. An injection device (1) according to claim 1, characterized in that
within the oxygen injector (10), an additive injector in form of an additional coaxial tube with an outlet opening (16), which is formed as a mouth or nozzle, is arranged.

5. An injection device (1) according to claim 4, characterized in that
the outlet opening (16) of the additive injector (15) is formed of a wear-resistant material and is replaceable.

6. An injection device (1) according to claim 1, characterized in that
separate subassemblies of the injector device (1) are mounted on a common support arranged in a wall of the metallurgical installation.

7. An injection device (1) for pyrometallurgical treatment of metals, metal melts, and or slags in a metallurgical installation or a melting vessel, in particular for blowing up or in oxygen-rich gases and/or carbon-containing material in an electric arc furnace, wherein the injection device accelerates oxygen-containing gases, (6) to a supersonic speed, with an ejected therefrom, high-velocity jet (6') being protected by a gaseous envelope completely enveloping same for using the same for pyrometallurgical treatment, characterized by a modular construction of separate subassemblies consisting of an oxygen injector (10) with an inner wall (11) and a Laval nozzle (13) for accelerating an oxygen-rich gas (6), which is surrounded by a hot gas union (2) an outlet region of which defines an annular nozzle slot (4) for passing and acceleration of a hot gas (5) and in an entrance region of which, water spray means is arranged.

8. An injection device (1) for pyrometallurgical treatment of metals, metal melts, and or slags in a metallurgical installation or a melting vessel, in particular for blowing up or in oxygen-rich gases and/or carbon-containing material in an electric arc furnace, wherein the injection device accelerates oxygen-containing gases, (6) to a supersonic speed, with an ejected therefrom, high-velocity jet (6') being protected by a gaseous envelope completely enveloping same for using the same for pyrometallurgical treatment, characterized by a modular construction of separate subassemblies consisting of an oxygen injector (10) with an inner wall (11) and a Laval nozzle (13) for accelerating an oxygen-rich gas (6), which is surrounded by a hot gas union (2) an outlet region of which defines an annular nozzle slot (4) for passing and acceleration of a hot gas (5), and characterized in that
within the central oxygen injector (10), an additive injector in form of an additional coaxial tube with an outlet opening (16), which is formed as a mouth or nozzle, is arranged,
the additive injector (15) being axially displaceable and positioned with its outlet plane (B) between planes (E1) and (E2) of an oxygen injector (10).

* * * * *